(12) United States Patent
Kim et al.

(10) Patent No.: US 9,212,909 B2
(45) Date of Patent: Dec. 15, 2015

(54) METHOD OF MANUFACTURING INERTIAL SENSOR

(75) Inventors: Jong Woon Kim, Seoul (KR); Jung Won Lee, Seoul (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 687 days.

(21) Appl. No.: 13/541,279

(22) Filed: Jul. 3, 2012

(65) Prior Publication Data

US 2013/0122189 A1    May 16, 2013

(30) Foreign Application Priority Data

Nov. 11, 2011  (KR) .................. 10-2011-0117531

(51) Int. Cl.
  *G01C 19/56*   (2012.01)
  *G01P 15/08*   (2006.01)
  *G01C 19/5769* (2012.01)

(52) U.S. Cl.
  CPC ........ *G01C 19/5769* (2013.01); *G01P 15/0802* (2013.01)

(58) Field of Classification Search
  USPC ........................................................ 427/58
  See application file for complete search history.

(56) References Cited

U.S. PATENT DOCUMENTS

| 6,920,788 B2 * | 7/2005 | Okada ................. 73/514.38 |
| 2005/0160814 A1 * | 7/2005 | Vaganov et al. ......... 73/514.01 |
| 2006/0219025 A1 * | 10/2006 | Takizawa ................. 73/777 |
| 2011/0265564 A1 * | 11/2011 | Acar et al. ............. 73/504.08 |

FOREIGN PATENT DOCUMENTS

JP        4216525      11/2008

* cited by examiner

*Primary Examiner* — Dah-Wei D Yuan
*Assistant Examiner* — Jose Hernandez-Diaz
(74) *Attorney, Agent, or Firm* — NSIP Law

(57) ABSTRACT

Disclosed herein is a method of manufacturing an inertial sensor. The method includes: (A) preparing a base substrate; (B) forming a depressed first concave part in one surface of the base substrate; (C) forming a mass body in the first concave part by filling a metal or a combination of a metal and a polymer (or a polymer matrix composite) therein; and (D) forming a depressed second concave part in one surface of the base substrate at an outer side of the mass body and forming a flexible part on an upper portion of the second concave part in the base substrate. The mass body formed of the metal or the combination of the metal and the polymer (or the polymer matrix composite) has high density, thereby making it possible to improve sensitivity of the inertial sensor.

10 Claims, 8 Drawing Sheets

METHOD OF MANUFACTURING INERTIAL SENSOR

CROSS REFERENCE TO RELATED APPLICATION

This application claims the benefit of Korean Patent Application No. 10-2011-0117531, filed on Nov. 11, 2011, entitled "Method of Manufacturing Inertial Sensor", which is hereby incorporated by reference in its entirety into this application.

BACKGROUND OF THE INVENTION

1. Technical Field

The present invention relates to a method of manufacturing an inertial sensor.

2. Description of the Related Art

Recently, an inertial sensor has been used as various applications, for example, military such as an artificial satellite, a missile, an unmanned aircraft, or the like, vehicles such as an air bag, electronic stability control (ESC), a black box for a vehicle, or the like, hand shaking prevention of a camcoder, motion sensing of a mobile phone or a game machine, navigation, or the like.

The inertial sensor generally adopts a configuration in which a mass body is adhered to an elastic substrate such as a membrane, or the like, in order to measure acceleration and angular velocity. Through the configuration, the inertial sensor may calculate the acceleration by measuring inertial force applied to the mass body and may calculate the angular velocity by measuring Coriolis force applied to the mass body.

In detail, a scheme of measuring the acceleration and the angular velocity using the inertial sensor is as follows. First, the acceleration may be calculated by Newton's law of motion "F=ma", where "F" represents inertial force applied to the mass body, "m" represents a mass of the mass body, and "a" is acceleration to be measured. Among others, the acceleration a may be obtained by sensing the inertial force F applied to the mass body and dividing the sensed inertial force F by the mass m of the mass body that is a predetermined value. Further, the angular velocity may be obtained by Coriolis force "F=2 mΩ×v", where "F" represents the Coriolis force applied to the mass body, "m" represents the mass of the mass body, "Ω" represents the angular velocity to be measured, and "v" represents the motion velocity of the mass body. Among others, since the motion velocity V of the mass body and the mass m of the mass body are values known in advance, the angular velocity Ω may be obtained by detecting the Coriolis force (F) applied to the mass body.

In order to measure the acceleration and the angular velocity in the above-mentioned scheme, the inertial sensor according to the prior art adopts a configuration in which a mass body is adhered to a flexible member such as a diaphragm, or the like, as disclosed in Japanese Registration Patent No. 4216525.

However, in the inertial sensor according to the prior art, since the mass body is formed of silicon, the mass body has relatively low density, such that a signal to noise ratio is low. Therefore, sensitivity of the inertial sensor is deteriorated. In order to solve this problem, the density of the mass body should be increased. However, a method of manufacturing an inertial sensor by a precise process while increasing density of a mass body has not been present until now.

SUMMARY OF THE INVENTION

The present invention has been made in an effort to provide a method of manufacturing an inertial sensor capable of improving sensitivity by forming a mass body using a material having relatively high density and increasing a signal to noise ratio by reducing Brownian noise.

According to a preferred embodiment of the present invention, there is provided a method of manufacturing the inertial sensor, the method including: (A) preparing a base substrate; (B) forming a depressed first concave part in one surface of the base substrate; (C) forming a mass body in the first concave part by filling a metal or a combination of a metal and a polymer (or a polymer matrix composite) therein; and (D) forming a depressed second concave part in one surface of the base substrate at an outer side of the mass body and forming a flexible part on an upper portion of the second concave part in the base substrate.

The first concave part may have a depth that is the same as that of the second concave part.

The first concave part may have a depth shallower than that of the second concave part.

In step (B), the first concave part may have a constant width.

In step (B), the first concave part may have a width that becomes narrow toward the other surface of the base substrate.

In step (B), the first concave part may have a width that is constant from one surface of the base substrate to a first depth and becomes narrow from the first depth to a second depth toward the other surface of the base substrate.

In step (B), the first concave part may have a width that becomes narrow from one surface of the base substrate to a first depth toward the other surface of the base substrate and is constant from the first depth to a second depth.

In step (B), the first concave part may have a width that is constant from one surface of the base substrate to a first depth, becomes narrow from the first depth to a second depth toward the other surface of the base substrate, and is constant from the second depth to a third depth.

In step (B), a depressed third concave part may be formed in one surface of an edge of the base substrate, in step (C), a post may be formed in the third concave part by filling a metal or a combination of a metal and a polymer (or a polymer matrix composite) therein, and in step (D), the second concave part may be formed between the mass body and the post.

The third concave part may have a width that becomes narrow toward the other surface of the base substrate.

In step (B), a depressed third concave part may be formed in one surface of an inner side of an edge of the base substrate, in step (C), a post may be formed in the third concave part by filling a metal or a combination of a metal and a polymer (or a polymer matrix composite) therein, and in step (D), the second concave part may be formed between the mass body and the post.

The third concave part may have a constant width.

The method may further include, before step (C), forming an interface layer in the first concave part.

The method may further include, before step (C), forming an interface layer in the third concave part.

According to another preferred embodiment of the present invention, there is provided a method of manufacturing an inertial sensor, the method including: (A) preparing a base substrate; (B) forming a penetration part penetrating through the base substrate; (C) forming a mass body in the penetration part by filling a metal or a combination of a metal and a polymer (or a polymer matrix composite) therein; and (D) forming a flexible part patterned so as to penetrate through the base substrate at an outer side of the mass body.

The penetration part may have a constant width.

The method may further include, before step (C), forming an interface layer in the penetration part.

DESCRIPTION OF THE PREFERRED EMBODIMENTS

Figure 1:
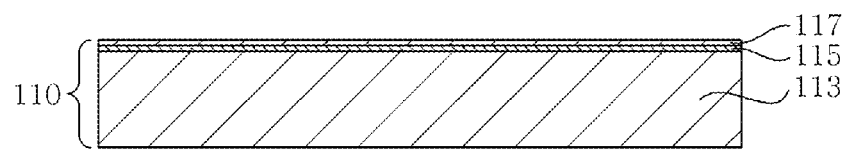
FIGS. 1, 2A, 2B, 3A, 3B, 4A and 4B are cross-sectional views sequentially showing a method of manufacturing an inertial sensor according to a first preferred embodiment of the present invention.

Various objects, advantages and features of the invention will become apparent from the following description of embodiments with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. In the description, the terms "first", "second", and so on are used to distinguish one element from another element, and the elements are not defined by the above terms. Further, in describing the present invention, a detailed description of related known functions or configurations will be omitted so as not to obscure the subject of the present invention.

Hereinafter, preferred embodiments of the present invention will be described in detail with reference to the accompanying drawings.

FIGS. 1, 2A, 2B, 3A, 3B, 4A and 4B are cross-sectional views sequentially showing a method of manufacturing an inertial sensor according to a first preferred embodiment of the present invention.

As shown in FIGS. 1 to 4, the method of manufacturing the inertial sensor 100 according to the present embodiment includes (A) preparing a base substrate 110, (B) forming a depressed first concave part 120 in one surface of the base substrate 110, (C) forming a mass body 125 in the first concave part 120 by filling a metal or a combination of a metal and a polymer (or a polymer matrix composite) therein, and (D) forming a depressed second concave part 130 in one surface of the base substrate 110 at an outer side of the mass body 125 and forming a flexible part 135 on an upper portion of the second concave part 130 in the base substrate 110.

First, as shown in FIG. 1, the base substrate 110 is prepared. Here, as the base substrate 110, a silicon-on-insulator (SOI) substrate on which a micro electromechanical systems (MEMS) process is easily performed may be used. Here, the SOI substrate is formed by sequentially stacking a first silicon layer 113, a silicon oxide layer 115, and a second silicon layer 117. However, the case in which the SOI substrate is used as the base substrate 110 is only an example. That is, the base substrate 110 is not necessarily limited to being the SOI substrate but may be all substrates known in the art such as a silicon substrate, or the like.

Next, as shown in FIG. 2, the depressed first concave part 120 is formed in one surface of the base substrate 110. Here, the first concave part 120 may be formed by disposing a mask and then performing selective etching. Here, in order to form the first concave part 120 so as to have a constant width, the first concave part 120 may be formed by anisotropic dry etching.

Figure 2A:
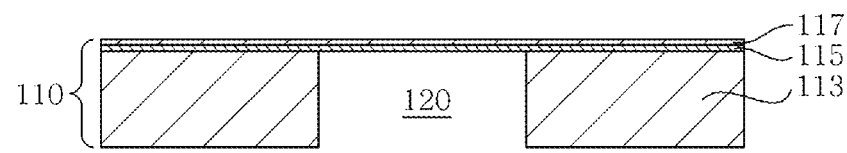
Figure 2B:
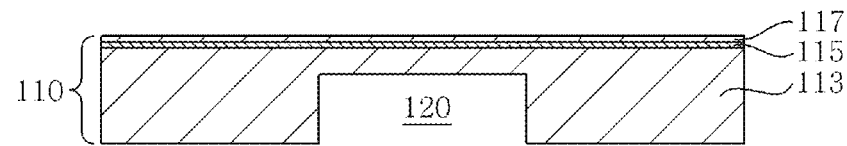

Meanwhile, in the case in which the base substrate 110 is the SOI substrate, the first concave part 120 may be formed by removing the first silicon layer 113 so that the silicon oxide layer 115 is exposed (See FIG. 2A) or may be formed by removing the first silicon layer 113 so that the silicon oxide layer 115 is not exposed, thereby making it possible to allow a predetermined thickness of the first silicon layer 113 to remain (See FIG. 2B).

Then, as shown in FIG. 3, the mass body 125 is formed in the first concave part 120 by filling a metal or a combination of a metal and a polymer (or a polymer matrix composite) therein. Here, the metal or the combination of the metal and the polymer (or the polymer matrix composite) may have density relatively higher than that of silicon. Therefore, the mass body 125 formed of the above-mentioned material also has high density, thereby making it possible to improve sensitivity of the inertial sensor 100, and Brownian noise is reduced, thereby making it possible to increase a signal to noise ratio. A process of forming the mass body 125 will be described in detail. An interface layer 160 may be first formed in the first concave part 120 in order to improve wettability before the above-mentioned material is filled. Here, the interface layer 160 may be formed of a gold plating layer, or the like. Thereafter, a metal is melted, filled in the first concave part 120 and then solidified or a combination of a metal and a polymer (or a polymer matrix composite) is prepared in a paste form, filled in the first concave part 120, and then cured. Here, as the metal, a solder having a lower melting point, excellent bondability, and a cheap cost may be used.

Figure 3A:
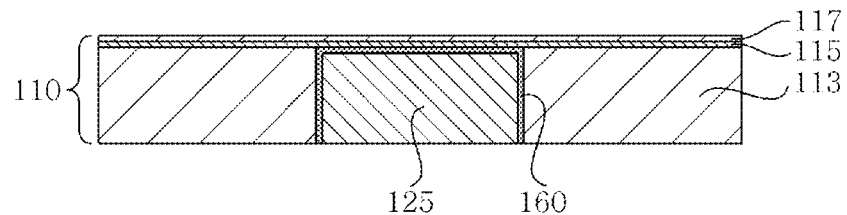
Figure 3B:
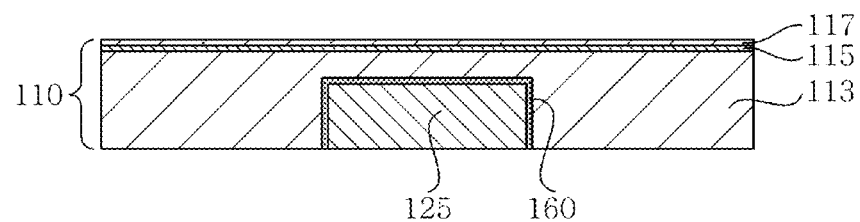
Figure 4A:
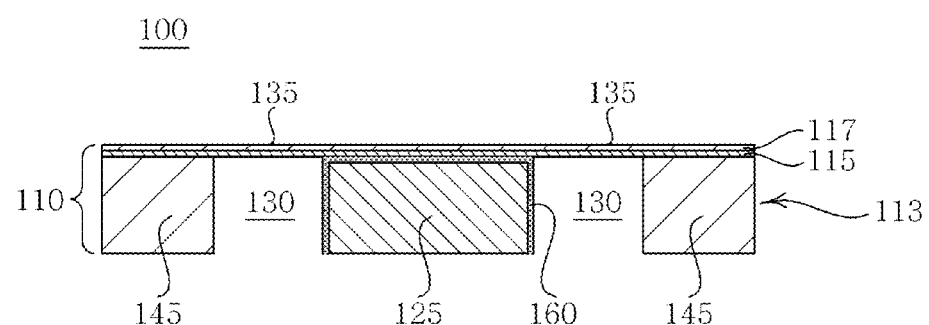
Figure 4B:
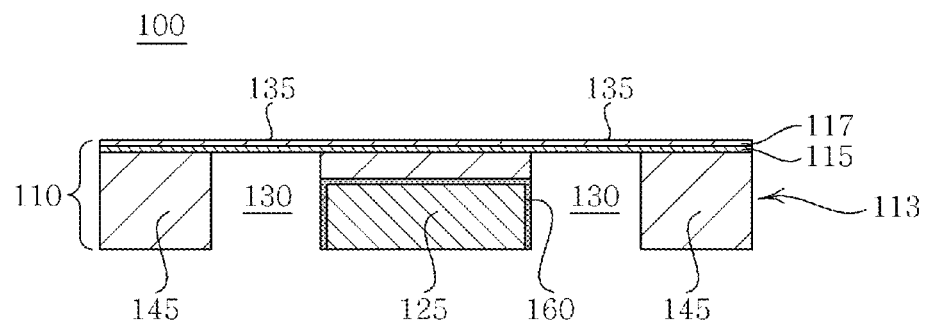

Meanwhile, in the case in which the base substrate 110 is the SOI substrate and the first concave part 120 is formed by removing the first silicon layer 113 so that the silicon oxide layer 115 is exposed (See FIG. 2A), sides of the mass body 125 contact the first silicon layer 113, and an upper surface of the mass body 125 contacts the silicon oxide layer 115 (see FIG. 3A). On the other hand, in the case in which the first concave part 120 is formed by removing the first silicon layer 113 so that the silicon oxide layer 115 is not exposed, thereby allowing a predetermined thickness of the first silicon layer 113 to remain (See FIG. 2B), all of sides and an upper surface of the mass body 125 contact the first silicon layer 113 (See FIG. 3B).

Then, as shown in FIG. 4, the depressed second concave part 130 is formed in one surface of the base substrate 110 at the outer side of the mass body 125, and the flexible part 135 is formed on the upper portion of the second concave part 130 in the base substrate 110. Here, the second concave part 130 may be formed by disposing a mask and then performing selective etching. As described above, when the second concave part 130 is formed at the outer side of the mass body 125, since a thickness of a part in which the second concave part 130 is formed in the base substrate 110 becomes thin, the part may be used as the flexible part 135. In addition, an edge of the base substrate 110 remaining at an outer side of the second concave part 130 may be used as the post 145.

Meanwhile, when the base substrate 110 is the SOI substrate, the second concave part 130 is formed by removing the first silicon layer 113 so that the silicon oxide layer 115 is exposed. Therefore, in the case in which the first concave part 120 is formed by removing the first silicon layer 113 so that the silicon oxide layer 115 is exposed (See FIG. 2A), a depth of the first concave part 120 and a depth of the second concave part 130 are the same (See FIG. 4A). On the other hand, in the case in which the first concave part 120 is formed by removing the first silicon layer 113 so that the silicon oxide layer 115 is not exposed, thereby allowing a predetermined thickness of the first silicon layer 113 to remain (See FIG. 2B), the first concave part 120 may have a depth shallower than that of the second concave part 130 (See FIG. 4B).

The inertial sensor 100 formed through the above-mentioned manufacturing process includes the mass body 125, the flexible part 135, and the post 145. Here, the mass body 125 may be displaced by inertial force or Coriolis force and the flexible part 135 may have elasticity to allow the mass body 125 to be displaced. The post 145 supports the flexible part 135, thereby securing a space in which the mass body 125 may be displaced. Meanwhile, a driving unit is disposed on the flexible part 135, thereby making it possible to vibrate the mass body 125, or a sensing unit is disposed on the flexible part 135, thereby making it possible to measure displacement of the mass body 125. Here, the driving unit may be implemented in a piezoelectric scheme, a piezoresistive scheme, a capacitive scheme, or the like, and the sensing unit may be implemented in a piezoelectric scheme, or a capacitive scheme, or the like.

FIGS. 5, 6, 7 and 8 are cross-sectional views sequentially showing a method of manufacturing an inertial sensor according to a second preferred embodiment of the present invention.

As shown in FIGS. 5 to 8, the inertial sensor 200 according to the present embodiment is different in a shape of a first concave part 120 from the inertial sensor 100 according to the first preferred embodiment described above. Further, in the inertial sensor 200 according to the present embodiment, a process of forming a third concave part 140 is added. Therefore, in the present embodiment, a description of portions overlapped with that of the first preferred embodiment will be omitted and the shape of the first concave part 120 and the process of forming the third concave part 140 will be mainly described.

Figure 5:
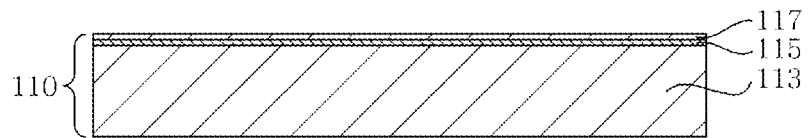
FIGS. 5, 6, 7 and 8 are cross-sectional views sequentially showing a method of manufacturing an inertial sensor according to a second preferred embodiment of the present invention.

First, as shown in FIG. 5, a base substrate 110 is prepared. Here, the base substrate 110 may be an SOI substrate formed by sequentially stacking a first silicon layer 113, a silicon oxide layer 115, and a second silicon layer 117 but is not limited thereto.

Figure 6:
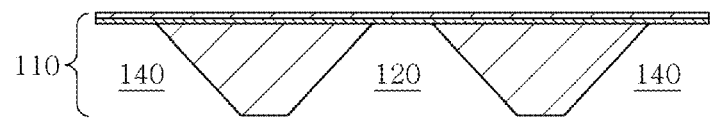

Next, as shown in FIG. 6, a depressed first concave part 120 is formed in one surface of the base substrate 110. Here, the first concave part 120 may be formed by disposing a mask and then performing selective etching. Here, the first concave part 120 is formed by anisotropic wet etching, such that the first concave part 120 may have a width that becomes narrow toward the other surface of the base substrate 110 (an opposite surface to a surface in which the first concave part 120 is formed)

In addition, a depressed third concave part 140 may be formed in one surface of an edge of the base substrate 110 simultaneously with forming the first concave part 120. Here, the third concave part 140 may be formed together with the first concave part 120 by disposing a mask and then performing selective etching. Here, the third concave part 140 is also formed by the anisotropic wet etching, such that the third concave part 140 may have a width that becomes narrow toward the other surface of the base substrate 110, similar to the width of the first concave part 120.

Figure 7:
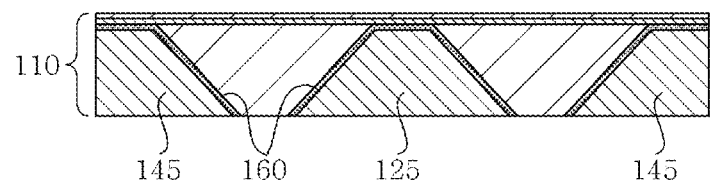

Then, as shown in FIG. 7, a mass body 125 is formed in the first concave part 120 by filling a metal or a combination of a metal and a polymer (or a polymer matrix composite) therein. Here, the mass body 125 formed of the metal or the combination of the metal and the polymer (or the polymer matrix composite) has relatively high density, thereby making it possible to improve sensitivity of the inertial sensor 200, and Brownian noise is reduced, thereby making it possible to increase a signal to noise ratio.

In addition, a post 145 may be formed in the third concave part 140 by filling the metal or the combination of the metal and the polymer (or the polymer matrix composite) therein simultaneously with forming the mass body 125.

A process of forming the mass body 125 and the post 145 will be described in detail. An interface layer 160 such as a gold plating layer, or the like, may be first formed in the first concave part 120 and the third concave part 140 in order to improve wettability before the above-mentioned material is filled. Thereafter, a metal is melted, filled in the first and third concave parts 120 and 140 and then solidified or a combination of a metal and a polymer (or a polymer matrix composite) is prepared in a paste form, filled in the first and third concave parts 120 and 140, and then cured.

Meanwhile, since each of the first and third concave parts 120 and 140 has a width that becomes narrow toward the other surface of the base substrate 110, each of the mass body 125 formed in the first concave part 120 and the post 145 formed in the third concave part 140 also has a width that becomes narrow toward the other surface of the base substrate 110.

Figure 8:
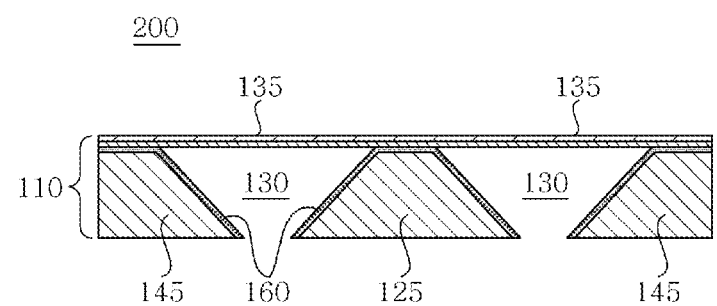

Then, as shown in FIG. 8, a depressed second concave part 130 is formed between the mass body 125 and the post 145, and the flexible part 135 is formed on the upper portion of the second concave part 130 in the base substrate 110. Here, the second concave part 130 may be formed by disposing a mask and then performing selective etching between the mass body 125 and the post 145. However, the mask is not necessarily disposed in order to form the second concave part 130. The second concave part 130 may be formed by selectively removing only the base substrate 110 formed of silicon by isotropic wet etching having high selectivity, using the fact that the base substrate 110 is formed of the silicon and the mass body 125 and the post 145 are formed of the metal or the combination of the metal and the polymer (or the polymer matrix composite).

As described above, when the second concave part 130 is formed between the mass body 125 and the post 145 so that the mass body 125 and the post 145 are separated from each other, since a thickness of a part in which the second concave part 130 is formed in the base substrate 110 becomes thin, the part may be used as the flexible part 135.

Meanwhile, as described above, since the widths of the mass body 125 and the post 145 become narrow toward the other surface of the base substrate 110, a length of the flexible part 135 relatively increases, and a spring constant thereof decreases. In addition, since the width of the mass body 125 becomes narrow toward the other surface of the base substrate 110 (that is, becomes wide toward one surface of the base substrate 110), the entire mass of the mass body 125 may increase. As a result, the spring constant of the flexible part 135 decreases and the mass of the mass body 125 increases, such that displacement of the mass body 125 relatively increases with respect to the same force, thereby making it possible to improve sensitivity of the inertial sensor 200.

FIGS. 9, 10A, 10B, 10C, 11A, 11B, 11C, 12A, 12B and 12C are cross-sectional views sequentially showing a method of manufacturing an inertial sensor according to a third preferred embodiment of the present invention.

As shown in FIGS. 9 to 12, the inertial sensor 300 according to the present embodiment is different in a shape of a first concave part 120 and disposition of a third concave part 140 from the inertial sensor 200 according to the second preferred embodiment described above. Therefore, in the present embodiment, a description of portions overlapped with that of the second preferred embodiment will be omitted and the shape of the first concave part 120 and the disposition of the third concave part 140 will be mainly described.

Figure 9:
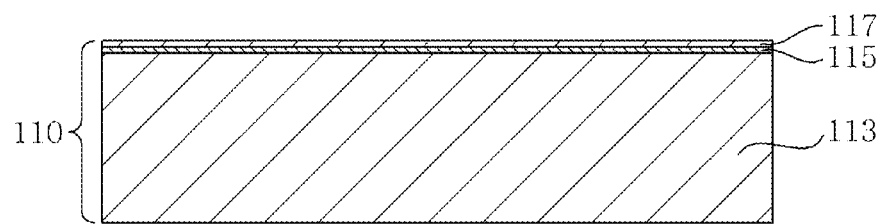
FIGS. 9, 10A, 10B, 10C, 11A, 11B, 11C, 12A, 12B and 12C are cross-sectional views sequentially showing a method of manufacturing an inertial sensor according to a third preferred embodiment of the present invention.

First, as shown in FIG. 9, a base substrate 110 is prepared.

Next, as shown in FIG. 10, a depressed first concave part 120 is formed in one surface of the base substrate 110. Here, the first concave part 120 may be formed by disposing a mask and then performing selective etching.

Here, the first concave part 120 may be formed in three forms. A detailed description thereof will be provided below.

Figure 10A:
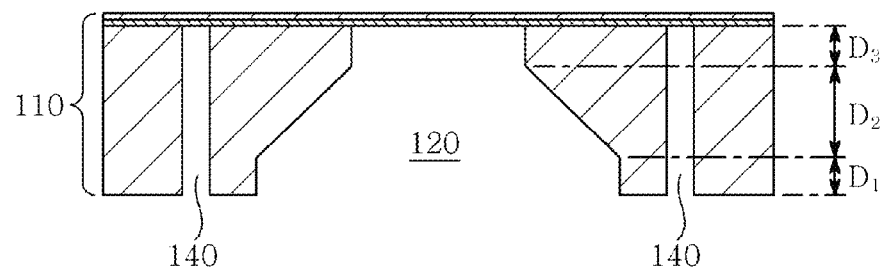

First, as shown in FIG. 10A, the first concave part 120 may be formed to have a width that is constant from one surface of the base substrate 110 to a first depth $D_1$, becomes narrow from the first depth $D_1$ to a second depth $D_2$ toward the other surface of the base substrate 110, and is constant from the second depth $D_2$ to a third depth $D_3$.

Figure 10B:
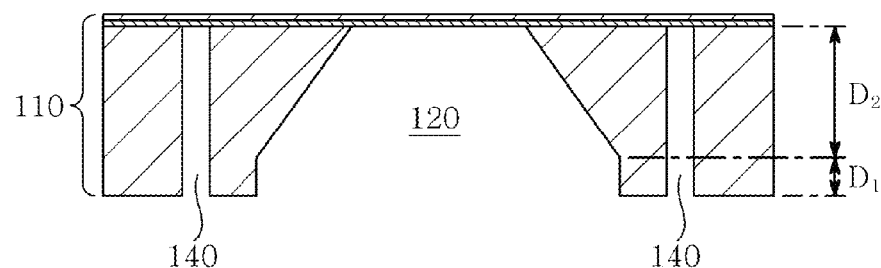

Second, as shown in FIG. 10B, the first concave part 120 may be formed to have a width that is constant from one surface of the base substrate 110 to a first depth $D_1$ and becomes narrow from the first depth $D_1$ to a second depth $D_2$ toward the other surface of the base substrate 110.

Figure 10C:
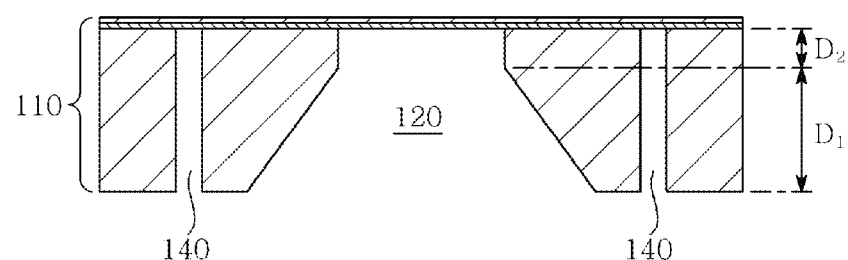

Third, as shown in FIG. 10C, the first concave part 120 may be formed to have a width that becomes narrow from one surface of the base substrate 110 to a first depth $D_1$ toward the other surface of the base substrate 110 and is constant from the first depth $D_1$ to a second depth $D_2$.

As a result, the first concave part 120 may be formed by combining a process of forming the first concave part 120 so as to have a constant width and a process of forming the first concave part 120 so as to have a width that becomes narrow toward the other surface of the base substrate 110 with each other. Here, anisotropic dry etching may be used in the process of forming the first concave part 120 so as to have a constant width, and anisotropic wet etching may be used in the process of forming the first concave part 120 so as to have a width that becomes narrow toward the other surface of the base substrate 110.

In addition, a depressed third concave part 140 may be formed in one surface of an inner side of an edge of the base substrate 110 simultaneously with forming the first concave part 120. Here, the third concave part 140 may be formed together with the first concave part 120 by disposing a mask and then performing selective etching. Here, in order to form the third concave part 140 so as to have a constant width, the third concave part 140 may be formed by anisotropic dry etching. Meanwhile, since the third concave part 140 is formed an the inner side of the edge of the base substrate 110, the edge of the base substrate 110 remains without being removed by the etching.

Then, as shown in FIG. 11, a mass body 125 is formed in the first concave part 120 by filling a metal or a combination of a metal and a polymer (or a polymer matrix composite) therein. Here, the mass body 125 formed of the metal or the combination of the metal and the polymer (or the polymer matrix composite) has relatively high density, thereby making it possible to improve sensitivity of the inertial sensor 300, and Brownian noise is reduced, thereby making it possible to increase a signal to noise ratio.

In addition, a post 145 may be formed in the third concave part 140 by filling the metal or the combination of the metal and the polymer (or the polymer matrix composite) therein simultaneously with forming the mass body 125. Here, the edge of the base substrate 110 remains at an outer side of the post 145. This edge of the base substrate 110 finally serves to support the flexible part 135 together with the post 145.

A process of forming the mass body 125 and the post 145 will be described in detail. An interface layer 160 such as a gold plating layer, or the like, may be first formed in the first concave part 120 and the third concave part 140 in order to improve wettability before the above-mentioned material is filled. Thereafter, a metal is melted, filled in the first and third concave parts 120 and 140 and then solidified or a combination of a metal and a polymer (or a polymer matrix composite) is prepared in a paste form, filled in the first and third concave parts 120 and 140, and then cured.

Meanwhile, since the first concave part 120 may be formed in three shapes, the mass body 125 may also be formed in three forms, corresponding to the first concave part 120.

Figure 11A:
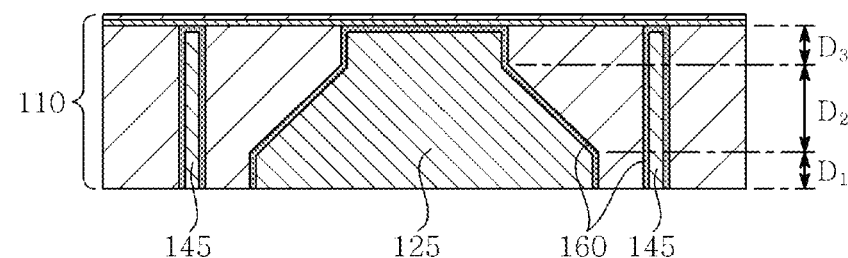

First, as shown in FIG. 11A, the mass body 125 may be formed to have a width that is constant from one surface of the base substrate 110 to a first depth $D_1$, becomes narrow from the first depth $D_1$ to a second depth $D_2$ toward the other surface of the base substrate 110, and is constant from the second depth $D_2$ to a third depth $D_3$.

Figure 11B:
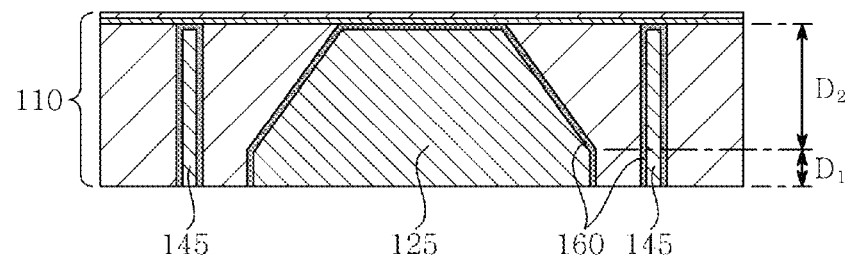

Second, as shown in FIG. 11B, the mass body 125 may be formed to have a width that is constant from one surface of the base substrate 110 to a first depth $D_1$ and becomes narrow from the first depth $D_1$ to a second depth $D_2$ toward the other surface of the base substrate 110.

Figure 11C:
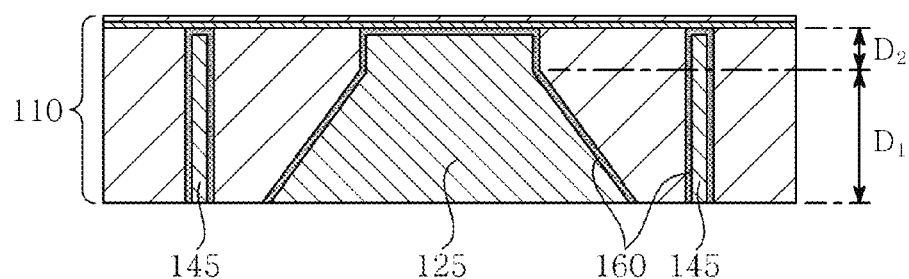
Figure 12A:
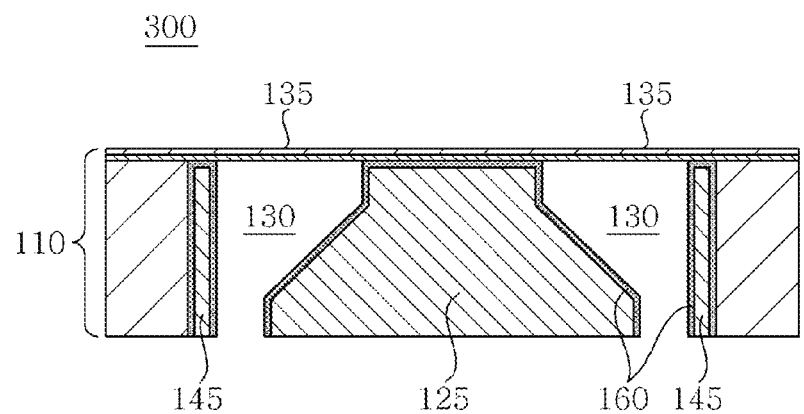
Figure 12B:
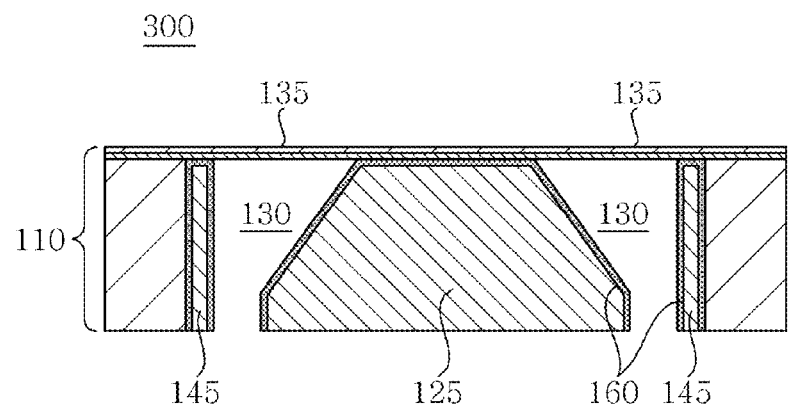
Figure 12C:
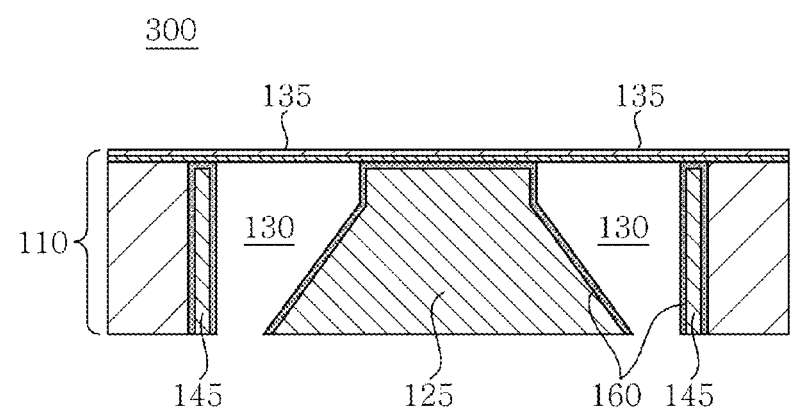

Third, as shown in FIG. 11C, the mass body 125 may be formed to have a width that becomes narrow from one surface of the base substrate 110 to a first depth $D_1$ toward the other surface of the base substrate 110 and is constant from the first depth $D_1$ to a second depth $D_2$.

As described above, when the mass body 125 is formed to have a width that becomes narrow toward the other surface of the base substrate 110, the mass body 125 has a width that becomes wide toward one surface of the base substrate 110, thereby making it possible to increase the entire mass of the mass body 125 (See FIG. 11A to 11C). However, when a lower surface of the mass body 125 becomes excessively wide, the entire size of the inertial sensor 300 increases. Therefore, a lower portion of the mass body 125 may be formed to constant a constant width (See FIG. 11A or FIG. 11B). In addition, when an angle at which an upper surface of the mass body 125 contacts the flexible part 135 (See FIG. 12) is excessively small, stress concentration may be generated. Therefore, an upper portion of the mass body 125 may be formed to have a constant width (See FIG. 11A or FIG. 11C).

Then, as shown in FIG. 12, a depressed second concave part 135 is formed between the mass body 125 and the post 145, and the flexible part 135 is formed on the upper portion of the second concave part 130 in the base substrate 110. Here, the second concave part 130 may be formed by disposing a mask and then performing selective etching between the mass body 125 and the post 145. In addition, when the second concave part 130 is formed by etching, the post 145 formed of the metal or the combination of the metal and the polymer (or the polymer matrix composite) is disposed at an outer side of the second concave part 130, thereby making it possible to prevent overetching toward the post 145.

As described above, when the second concave part 130 is formed between the mass body 125 and the post 145 so that the mass body 125 and the post 145 are separated from each other, since a thickness of a part in which the second concave part 130 is formed in the base substrate 110 becomes thin, the part may be used as the flexible part 135.

FIGS. 13, 14, 15 and 16 are cross-sectional views sequentially showing a method of manufacturing an inertial sensor according to a fourth preferred embodiment of the present invention.

As shown in FIGS. 13 to 16, the method of manufacturing the inertial sensor 400 according to the present embodiment (A) preparing a base substrate 110, (B) forming a penetration part 150 penetrating through the base substrate 110; (C) forming a mass body 125 in the penetration part 150 by filling a metal or a combination of a metal and a polymer (or a polymer matrix composite) therein; and (D) forming a flexible part 135 patterned so as to penetrate through the base substrate 110 at an outer side of the mass body 125.

Figure 13:
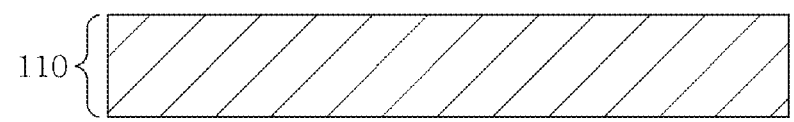
FIGS. 13, 14, 15 and 16 are cross-sectional views sequentially showing a method of manufacturing an inertial sensor according to a fourth preferred embodiment of the present invention.

First, as shown in FIG. 13, a base substrate 110 is prepared. Here, as the base substrate 110, a silicon substrate on which a MEMS process is easily performed may be used. However, the base substrate 110 is not necessarily limited to being the silicon substrate but may be all substrates known in the art.

Figure 14:
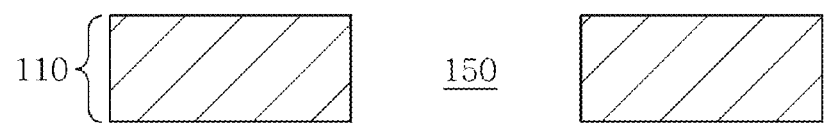

Then, as shown in FIG. 14, the penetration part 150 penetrating through the base substrate 110 is formed. Here, the penetration part 150 may be formed by disposing a mask and then performing selective etching. Here, in order to form the penetration part 150 so as to have a constant width, the penetration part 150 may be formed by anisotropic dry etching.

Figure 15:
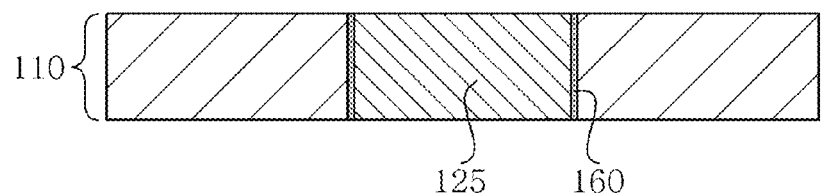

Then, as shown in FIG. 15, the mass body 125 is formed in the penetration part 150 by filling a metal or a combination of a metal and a polymer (or a polymer matrix composite) therein. Here, the mass body 125 formed of the metal or the combination of the metal and the polymer (or the polymer matrix composite) has relatively high density, thereby making it possible to improve sensitivity of the inertial sensor 400, and Brownian noise is reduced, thereby making it possible to increase a signal to noise ratio. A process of forming the mass body 125 will be described in detail. An interface layer 160 such as a gold plating layer, or the like, may be first formed in the penetration part 150 in order to improve wettability before the above-mentioned material is filled. Thereafter, a metal is melted, filled in the penetration part 150 and then solidified or a combination of a metal and a polymer (or a polymer matrix composite) is prepared in a paste form, filled in the penetration part 150, and then cured. Here, as the metal, a solder having a lower melting point, excellent bondability, and a cheap cost may be used.

Figure 16:
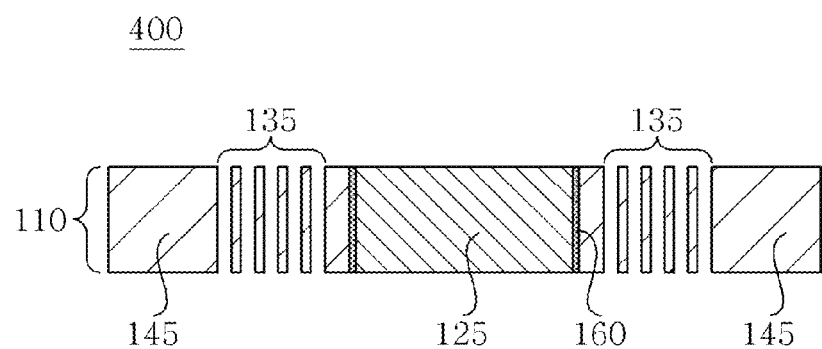

Then, as shown in FIG. 16, the flexible part 135 patterned so as to penetrate through the base substrate 110 at the outer side of the mass body 125 is formed. Here, the flexible part 135 may be formed by disposing a mask and then performing selective etching. As described above, by patterning the base substrate 110 at the outer side of the mass body 125, the flexible part 135 having a cantilever shape allowing the mass body 125 to be movable in a plane may be formed. In addition, an edge of the base substrate 110 remaining at an outer side of the flexible part 135 may be used as the post 145.

The inertial sensor 400 formed through the above-mentioned manufacturing process includes the mass body 125, the flexible part 135, and the post 145. Here, the mass body 125 may be displaced by inertial force or Coriolis force, the flexible part 135 may have elasticity to allow the mass body 125 to be displaced, and the post 145 may support the flexible part 135. Meanwhile, a driving unit is disposed on the flexible part 135, thereby making it possible to vibrate the mass body 125, or a sensing unit is disposed on the flexible part 135, thereby making it possible to measure displacement of the mass body 125.

In the method of manufacturing an inertial sensor according to the preferred embodiment of the present invention, the base substrate 110 (the SOI substrate, or the like) that may be precisely processed is etched and the mass body 125 is then formed using the etched base substrate as a mold. Therefore, even though the mass body 125 is formed of a metal or a combination of a metal and a polymer (or a polymer matrix composite), a processing error is not generated and precision is not deteriorated.

As set forth above, according to the preferred embodiments of the present invention, the mass body is formed of the material having relatively high density, thereby making it possible to improve sensitivity of the inertial sensor, and Brownian noise is decreased, thereby making it possible to increase a signal to noise ratio.

In addition, according to the preferred embodiments of the present invention, the base substrate (the SOI substrate, or the like) that may be precisely processed is etched and the mass body is then formed using the etched base substrate as a mold. Therefore, even though the mass body is formed of a metal or a combination of a metal and a polymer (or a polymer matrix composite), a processing error is not generated and precision is not deteriorated.

Although the embodiment of the present invention has been disclosed for illustrative purposes, it will be appreciated that a method of manufacturing an inertial sensor according to the invention is not limited thereto, and those skilled in the art will appreciate that various modifications, additions and substitutions are possible, without departing from the scope and spirit of the invention. Accordingly, any and all modifications, variations or equivalent arrangements should be considered to be within the scope of the invention, and the detailed scope of the invention will be disclosed by the accompanying claims.

What is claimed is:

1. A method of manufacturing an inertial sensor, the method comprising:
   (A) preparing a base substrate;
   (B) forming a depressed first concave part in one surface of the base substrate and a depressed third concave part in one surface of an edge of the base substrate;
   (C) forming a mass body and a post in the first concave part and the third concave part, respectively, by filling a metal or a combination of a metal and a polymer or a polymer matrix composite therein; and
   (D) forming a depressed second concave part in one surface of the base substrate between the mass body and the post and forming a flexible part on an upper portion of the second concave part in the base substrate.

2. The method as set forth in claim 1, wherein the first concave part has a depth that is the same as that of the second concave part.

3. The method as set forth in claim 1, wherein the first concave part has a depth shallower than that of the second concave part.

4. The method as set forth in claim 1, wherein in step (B), the first concave part and the third concave part have a constant width.

5. The method as set forth in claim 1, wherein in step (B), the first concave part and the third concave part have a width that becomes narrow toward the other surface of the base substrate.

6. The method as set forth in claim 1, wherein in step (B), the first concave part has a width that is constant from one surface of the base substrate to a first depth and becomes narrow from the first depth to a second depth toward the other surface of the base substrate.

7. The method as set forth in claim 1, wherein in step (B), the first concave part has a width that becomes narrow from one surface of the base substrate to a first depth toward the other surface of the base substrate and is constant from the first depth to a second depth.

8. The method as set forth in claim 1, wherein in step (B), the first concave part has a width that is constant from one surface of the base substrate to a first depth, becomes narrow from the first depth to a second depth toward the other surface of the base substrate, and is constant from the second depth to a third depth.

9. The method as set forth in claim 1, further comprising, before step (C), forming an interface layer in the first concave part.

10. The method as set forth in claim 1, further comprising, before step (C), forming an interface layer in the third concave part.

* * * * *